United States Patent
Umblijs (10) Patent No.: US 9,147,206 B2
(45) Date of Patent: Sep. 29, 2015

(54) MODEL OPTIMIZATION SYSTEM USING VARIABLE SCORING

(75) Inventor: Andris Umblijs, Knaphill Woking (GB)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 688 days.

(21) Appl. No.: 12/851,391

(22) Filed: Aug. 5, 2010

(65) Prior Publication Data

US 2011/0055127 A1    Mar. 3, 2011

Related U.S. Application Data

(60) Provisional application No. 61/238,363, filed on Aug. 31, 2009.

(51) Int. Cl.
*G06Q 30/06*    (2012.01)
*G06N 5/02*    (2006.01)

(52) U.S. Cl.
CPC ............... *G06Q 30/06* (2013.01); *G06N 5/025* (2013.01)

(58) Field of Classification Search
USPC .......................................................... 706/12
See application file for complete search history.

(56) References Cited

U.S. PATENT DOCUMENTS

| | | | |
|---|---|---|---|
| 5,457,625 A | 10/1995 | Lim et al. | |
| 6,327,582 B1 * | 12/2001 | Worzel | 706/13 |
| 7,062,447 B1 * | 6/2006 | Valentine et al. | 705/1.1 |
| 2002/0159642 A1 * | 10/2002 | Whitney | 382/225 |
| 2003/0130883 A1 * | 7/2003 | Schroeder et al. | 705/10 |
| 2004/0083152 A1 | 4/2004 | Markov et al. | |
| 2004/0210471 A1 | 10/2004 | Luby et al. | |
| 2006/0179026 A1 * | 8/2006 | Bechtel et al. | 706/45 |
| 2007/0192347 A1 | 8/2007 | Rossmark et al. | |
| 2008/0262721 A1 * | 10/2008 | Guo et al. | 701/208 |
| 2009/0083680 A1 | 3/2009 | McConaghy et al. | |

FOREIGN PATENT DOCUMENTS

| | | |
|---|---|---|
| JP | 10-240799 A | 9/1998 |
| JP | 2002-312527 A | 10/2002 |
| JP | 2003-242184 A | 8/2003 |

(Continued)

OTHER PUBLICATIONS

Park, Yang-Byung "A hybrid genetic algorithm for the vehicle scheduling problem with due times and time deadlines" Int. J. Production Economics 2001 [Online] Downloaded Sep. 11, 2012 http://ac.els-cdn.com/S0925527300001742/1-s2.0-S0925527300001742-main.pdf?_tid=df8783f6-fc6b-11e1-ae25-00000aab0f26&acdnat=1347407784_73b15e1575544e31bb8b3296f634fa19.*

(Continued)

*Primary Examiner* — Ben Rifkin
(74) *Attorney, Agent, or Firm* — Mannava & Kang, P.C.

(57) ABSTRACT

A model optimization system is configured to determine quality of variables for model generation. A data storage stores input variables, quality metrics for the input variables, and weights for the quality metrics. The quality metrics describe sufficiency of data for the input variables and the data is provided for a plurality of regions. A scoring module determines a score for each region based on the input variables and the weighted quality metrics. An optimizer determines whether at least one of the input variables for a region is to be modified based on the scores, and determines whether the total score for the region is operable to be improved using a modified input variable.

17 Claims, 7 Drawing Sheets

(56) References Cited

FOREIGN PATENT DOCUMENTS

| KR | 1020020010104 | A | 2/2002 |
| KR | 1020040021940 | B1 | 3/2004 |
| KR | 1020070013746 | A | 1/2007 |
| KR | 1020070076884 | B1 | 7/2007 |
| WO | 9853416 | A1 | 11/1998 |

OTHER PUBLICATIONS

Durbin, Martin "The Dance of the Thirty-Ton Trucks: Demand Dispatching in a Dynamic Environment" George Mason University. 2003 [Online] Downloaded Mar. 27, 2013 http://iris.gmu.edu/~khoffman/it882/TheDanceofthe30-TonTrucks.pdf.*

Huang, Cheng-Lung and CHieh-Jen Wang "A GA-based feature selection and parameters optimization for support vector machines" Expert Systems with Applications 31 (2006) p. 231-240 [Online] downloaded May 26, 2014 http://ac.els-cdn.com/S0957417405002083/1-s2.0-S0957417405002083-main.pdf?_tid=b000fd68-e5cd-11e3-b8a6-00000aacb35f&acdnat=1401215915_a747f24.*

Vafaie, Halch and Kenneth De Jong "Genetic Algorithms as a Tool for Feature Selection in Machine Learning" IEEE 1992 [Online] Downloaded May 28, 2014 http://ieeexplore.ieee.org/stamp/stamp.jsp?tp=&arnumber=246402.*

EPO: "Notice from the European Patent Office dated Oct. 1, 2007 concerning business methods", Official Journal of the European Patent Office, vol. 30, No. 11, Nov. 1, 2007, pp. 592-593, XP007905525, ISSN: 0170-9291.

* cited by examiner

FIG. 1

Glossary

| Term | 0 | 1 | 2 | 3 | Explanation |
|---|---|---|---|---|---|
| % Coverage (for (y) variable) | 0-20% | 21-40% | 41-75% | >75% | The percentage of the coverage of the data compared to the whole purchase volume or marketing investments |
| % Coverage (for (x) variable) | 0-20% | 21-60% | 61-90% | >90% | The percentage of the coverage of the data compared to the whole purchase volume or marketing investments. This variable includes outlier treatment and is used to transform the (x) variable to fit (y). |
| Data periodicity | Lump Sum | Quaterly | Monthly | Weekly | The time periodicity of the data. E.g. weekly, monthly, quarterly |
| Data Refresh Frequency | Yearly | Quaterly | Monthly | Weekly | How often data source is refreshed |

SCALE 205, 210 (Explanation), 201, 202, 203, 204

MODEL OPTIMIZATION SYSTEM USING VARIABLE SCORING

PRIORITY

This patent application claims priority to U.S. provisional application Ser. No. 61/238,363, filed Aug. 31, 2009 and entitled "Data Quality Scorecard", which is incorporated by reference in its entirety.

BACKGROUND

Modeling is commonly used to forecast or predict behavior or outcomes. These models may be generated through a regression analysis or other method of analyzing historic data. For example, companies use historic sales data to generate models that predict how sales will be impacted in the future, and these companies may make adjustments to improve sales or control product inventory accordingly.

There are many conventional techniques to evaluate the accuracy of the output, e.g., sales predictions, of these models. However, once a model is determined to be inaccurate, it is very difficult to improve the accuracy of the model if there is a problem with the input data used to generate the model. Poor model performance may be the result of insufficient data for certain model input parameters from certain data collection sources, or due to inconsistent calculations performed by different sources when determining the parameters. It may take many man hours to analyze each of the input parameters to identify which input parameters are causing the inaccuracies of the model predictions. Furthermore, the analysis may be further complicated by the fact there is no objective measure for evaluating the quality of the input parameters and for estimating the impact of different data quality aspects on the quality of the final model. In addition, it is costly for companies to collect the historic data and to build the models. Often, the collected data is not initially analyzed to determine whether the data can be used to build accurate models. As a result, time and money are wasted by building inaccurate models.

SUMMARY

According to an embodiment, a model optimization system is configured to determine quality of variables for model generation. A data storage stores input variables, quality metrics for the input variables, and weights for the quality metrics. The quality metrics describe sufficiency and quality of data for the input variables and the data is provided for a plurality of regions. A scoring module determines a score for each region based on the input variables and the weighted quality metrics. An optimizer determines whether at least one of the input variables for a region is to be modified based on the scores, and determines whether the total score for the region is operable to be improved using a modified input variable.

According to another embodiment, a method for determining quality of data for modeling comprises identifying input variables operable to be used for modeling to estimate a dependent variable; determining quality metrics describing sufficiency of data for the input variables, wherein the data is provided for a plurality of regions; weighting the quality metrics; and determining a score, by a computer system, for each region based on the weighted quality metrics. The method may be embodied in one or more computer programs comprising computer readable instructions and stored on a non-transitory computer readable medium. A computer system may executed the computer readable instructions to perform the method.

BRIEF DESCRIPTION OF DRAWINGS

The embodiments of the invention will be described in detail in the following description with reference to the following figures.

FIG. 2 illustrates examples of explanatory variables, according to an embodiment;

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Overview

According to an embodiment, a system is operable to determine whether sales impact data is sufficient to generate models that can be used to make accurate predictions about sales. The system is also operable to identify changes in sales impact data that are needed to improve the performance of the models to make accurate predictions. The models may include time series econometric models that use parameters from the sales impact data as input to make predictions about how a particular parameter or set of parameters will impact sales. Using these predictions, companies may modify marketing campaigns or other sales tactics to improve sales of their products. The system is operable to quantify the quality of the input parameters of the models to determine whether accurate models can be built or whether existing models can be improved.

The sales impact data, which is used as input for the models and which is evaluated by the system, includes any information related to sales or that may impact sales of a product. A product may be one or more goods or services. Examples of sales impact data include information on actual sales made, information on promotions, advertising and other marketing information, macroeconomic factors such as information regarding a recession or inflation, etc.

The embodiments described herein include one or more technical aspects. For example, the system generates a display that provides a convenient visualization of the sufficiency of data for generating models through scores. Thus, the embodiments may decrease the mental and physical effort required from a user in order to perform a task of determining whether data and variables are sufficient for generating an accurate model. Another technical aspect is the transformation of data, such as quality metrics, into scores that may use a simple scoring scale which allows a user to quickly identify the viability of input variables for model building as well as for optimization of input variables to improve models.

2. System

Figure 1:
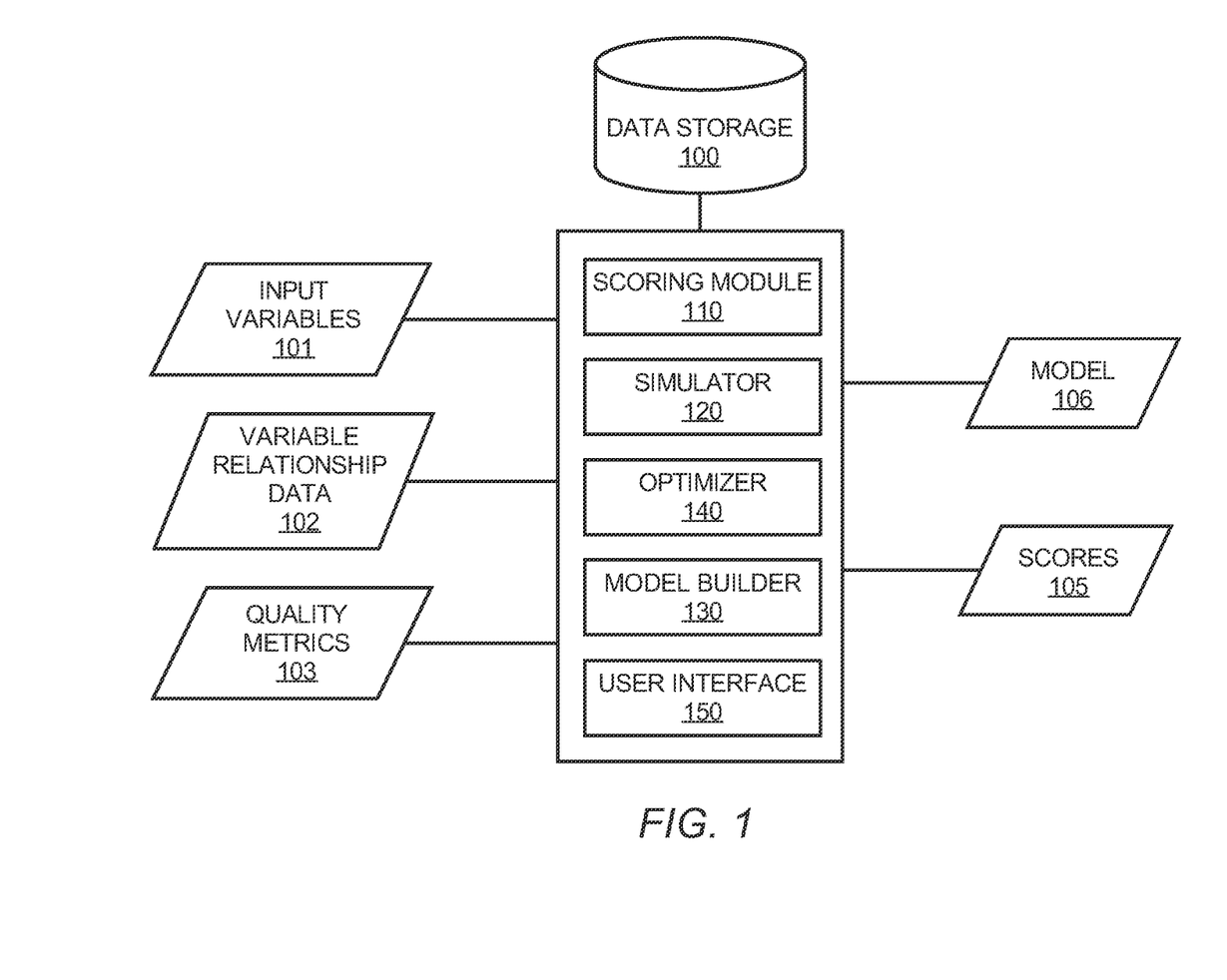
FIG. 1 illustrates a system, according to an embodiment.

FIG. 1 illustrates a model optimization system 100, according to an embodiment. The system 100 includes a scoring module 110, a simulator 120, a model builder 130, an optimizer 140, a user interface 150 and a data storage 160. The system 100 receives sales impact data, including input variables 101, variable relationship data 102, quality metrics 103 and other data used by the system 100 for evaluating variables and model building. This data and data and models generated by the system 100 are stored in the data storage 160, which may include a database or other type of storage system. At least some of the data stored in the data storage 160 and used by the system 100 may be received via the user interface 150.

Figure 3:
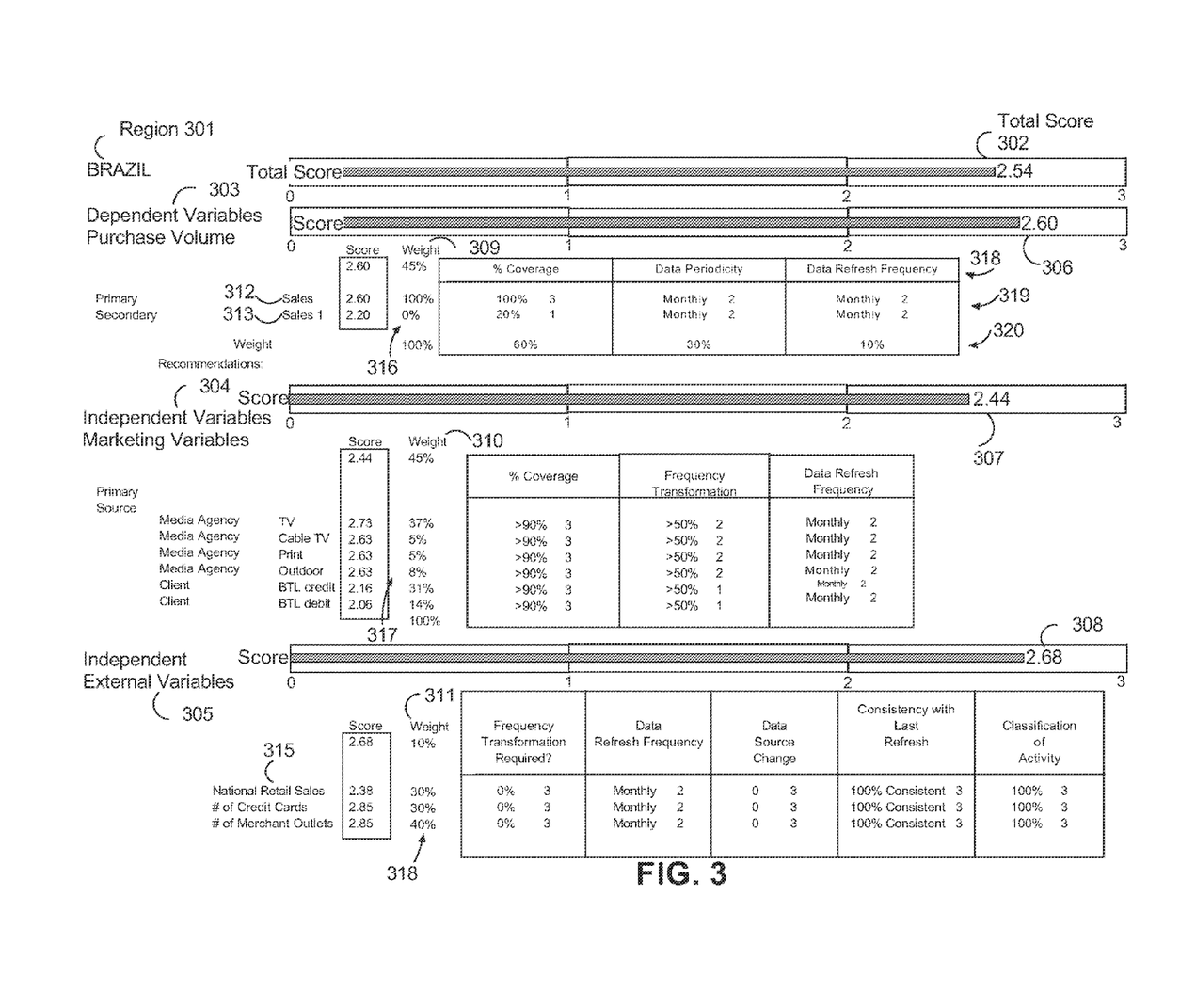
FIG. 3 illustrates examples of scores, according to an embodiment.

The scorer 110 determines scores 105 for input variables 101 included in the sales impact data. The input variables 101 are variables used to build a model 106. The model 106 may then be used to predict values for sales variables, which may be dependent variables that have values calculated from one or more of the input variables. Examples of the input variables 101 and quality metrics 105 for evaluating the input variables are shown in FIGS. 2 and 3 and described in further detail below.

The scores 105 for the input variables 101 may be used to evaluate and optimize the input variables 101 for model building and improving the accuracy of models, such as the model 106, for making predictions on sales variables. The scores 105 may include input quality metric scores, source scores, category scores and a total score. The scoring module 110 determines the quality metric scores for the quality metrics 103 for the input variables 101. These scores are used to calculate the source scores, which are related to the data sources providing the sales impact data and/or marketing channels. The quality metric scores are also used to calculate the category scores for different types of input variables. The total score is calculated from the calculated scores. The total score may be a total score for a geographic region, and indicates the quality of the input variables as applicable to the region. Also, weightings may be used to calculate the scores. The variable relationship data 102 includes the weights, ranges and scales used for scoring. The variable relationship data 102 may be determined based on accumulated knowledge of experts and applying a statistical distribution to determine the ranges and scales for scoring. Examples of the score calculations are provided with respect to FIGS. 2-4.

The system 100 also includes the simulator 120. The simulator 120 allows the optimizer 140 to change input variables, and then the simulator 120 sends the revised input variables to the scorer 110 to re-calculate the scores. For example, the optimizer 140 determines if a total score for a region is below a predetermined threshold. The optimizer 140 may determine that certain input variables are not of sufficient quality for generating models. The optimizer 140 may identify insufficient variables, for example, by comparing scores for the input variables to thresholds. A user may also visually view scores via the user interface 150 and select one or more input variables having low scores for replacement. The optimizer 140 determines whether the identified input variables can be modified. This may include determining whether there are any other sources of data for the insufficient variables. This determination may be based on searching the data storage 160 for other sources or receiving an indication from a user that other sources are available and also receiving the data for those sources. If another source is available, data from the new source is used to determine quality metric scores for the insufficient variables and to determine whether the total score can be improved using the new data.

A "problem" variable with a low score is identified, such as an input variable having a 1 for a % coverage quality metric. Ways to obtain an input variable with better quality are determined and performed. For example, the optimizer 140 can determine through simulations performed by the simulator 120 that an alternative source for the variable has to be found with a better % coverage score. If a better quality variable with better coverage is obtained then the simulator 120 and the scoring module 110 determine whether the change of the variable improves the total score sufficiently. If the change improves the score, then the input variables, including the modified problem variable, are sent to the model builder 130.

The model builder 130 builds the model 106 using the input variables. The model builder 130 may build models that can be used for regions having a total score above a threshold indicating the input variables are sufficient for model building for the region. For example, given a selected set of input variables, a statistical regression (e.g., linear regression) approach is used to determine model coefficients. These are coefficients for the variables of the model that best map the data for the variables (e.g., cost data for marketing channels) to corresponding historic performance data. Estimation of the coefficients of the variables for a model is performed using regression techniques to produce multi-variable functions (e.g., curves) that best fit computed output of the given input data to its corresponding output. In some embodiments the regression techniques perform non-linear regression for at least some of the variables of the model to account for any non-linear behavior associated with such variables (e.g., market variables that display diminishing returns behavior).

Determining the relationships between the variables and sales and determining the response curves, which make up the model, is further described in co-pending U.S. patent application Ser. No. 11/483,401, entitled "Modeling Marketing Data" by Andris Umblijs et al., filed Jul. 7, 2006, which is incorporated by reference in its entirety.

FIG. 2 shows examples of the quality metrics 103 for evaluating the input variables 101. The examples include % coverage 201 and 202, data periodicity 203 and data refresh frequency 204. Explanations 210 describe each of the quality metrics 201-204. It should be noted that other quality metrics may be used.

A scale 205 is shown. In this example, the scale 205 is 0-3. The values 0-3 in the scale are quality metric scores that may be determined by the scoring module 110 depending on the measurements and ranges for the quality metrics. Ranges are determined for each score. For example, for % coverage 201, the range 0-20% maps to score 0; the range 20-40% maps to score 1; the range 40-75% maps to score 2; and the range 75-100% maps to score 3. The scoring module 110 identifies the measured value for the % coverage metric 201, which may be provided by an external source and stored in the data storage 160. For example, the measured value is 30%, which falls within the range of 20-40%. Thus, the score for the % coverage metric 201 for a measured value of 30% is 1. Examples of ranges for scores are shown for each of the quality metrics 201-204 in FIG. 2.

The scale in this example is a simple scale of 0-3, so it is easier for users to quickly identify how good or poor an input variable is considered. However, more complex scales may be used. Also, the scale and ranges may be determined through expert analysis of historic data.

FIG. 3 shows examples of the scores 205 for a region 301. The region 301 in this example is Brazil, and the total score 302 for the region 301 is 2.54. Note that the total score 302 and other scores shown in FIG. 3 use the same scale used for the quality metrics, such as 0-3.

The scoring module 110 calculates the total score 302 from category scores, input variable scores and quality metric scores and weights for the input variables. The input variables are shown in categories. The categories are dependent variables 303, independent variables controller by the client 304, and independent external variables 305 not controlled by the client. The client may be a company or other entity that is using the system 100 to evaluate input variables and build models for estimating sales or other information.

The independent variables 304 are controlled by the client and may include marketing variables for different marketing channels, such as TV, cable TV, print, etc. The marketing variables may include amount spent for each marketing channel, uplift, etc. The independent external variables 305 are outside the client's control and may include national retail sales, number of credit cards, number of stores or merchant outlets, etc. The dependent variables 303 are variables to be explained and/or predicted by the independent variables. This may include variables whose values are to be predicted using the models. One example of a dependent variable is purchase volume. Other examples may be incremental sales, profits, customer lifetime, etc. There may be multiple variables under each category.

The scoring module 110 calculates category scores 306-308 for the categories 303-305, respectively. The category scores 306-308 are calculated using category weights 309-311, respectively, and source scores for each category.

The input variables are shown for each category. For example, a sales input variable 312 and a sales1 input variable 313 are shown for category 303. Category 304 has input variables 314 related to different marketing channels and category 305 has input variables 315. Input variable weights 316-318 are shown for each input variable in each category. The sum of input variable weights for each category may equal 100. For example, the sales input variable 312 has a weight of 100% and the sales1 input variable 313 has a weight of 0%. The weights described herein may be determined through expert analysis and data analysis. Sales1 may have a 0% weight because its source is considered unreliable. Other factors may also be considered. Note that sources may be shown if known. For example, the input variables 312 and 313 have data provided by a primary source and a secondary source respectively. The input variables 314 may have an external source, such as a media agency, or may be provided by the client.

The input variable scores are calculated from the quality metric scores and quality metric weights. Quality metrics 318 are shown for each of the input variables and may include % coverage, data periodicity and data refresh frequency. Quality metric scores are also shown and may be on the same scale of 0-3. Quality metric scores 310 are shown for the category 303. Quality metric weights 320 are also shown for the category 303 but not for the other categories, however, each category may use quality metric weights even if not shown.

The scores shown in FIG. 3 and described above may be calculated using the following equations.

$$\text{Total Score} = \sum_{i=1}^{n} \text{Category Score}_i * \text{Category Weight}_i \quad \text{Equation 1}$$

where n is the number of categories.

For example, the total score 302 is $2.64 = (2.6*0.45) + (2.44*0.45) + (2.68*0.1)$.

$$\text{Category Score} = \sum_{i=1}^{x} \text{Input Variable Score}_i * \text{Input Variable Weight}_i \quad \text{Equation 2}$$

where x is the number of input variables for the category.

For example, the category score for the dependent variable category 303 is $2.60 = (2.60*1.00) + (2.20*0.0)$.

$$\text{Input Variable Score} = \sum_{i=1}^{y} \text{Quality Metric Score}_i * \text{Quality Metric Weight}_i \quad \text{Equation 3}$$

where y is the number of quality metrics.

For example, the sales input variable score for the dependent variable category 303 is $2.60 = (3*0.60) + (2*0.30) + (2*0.10)$.

Figure 4:
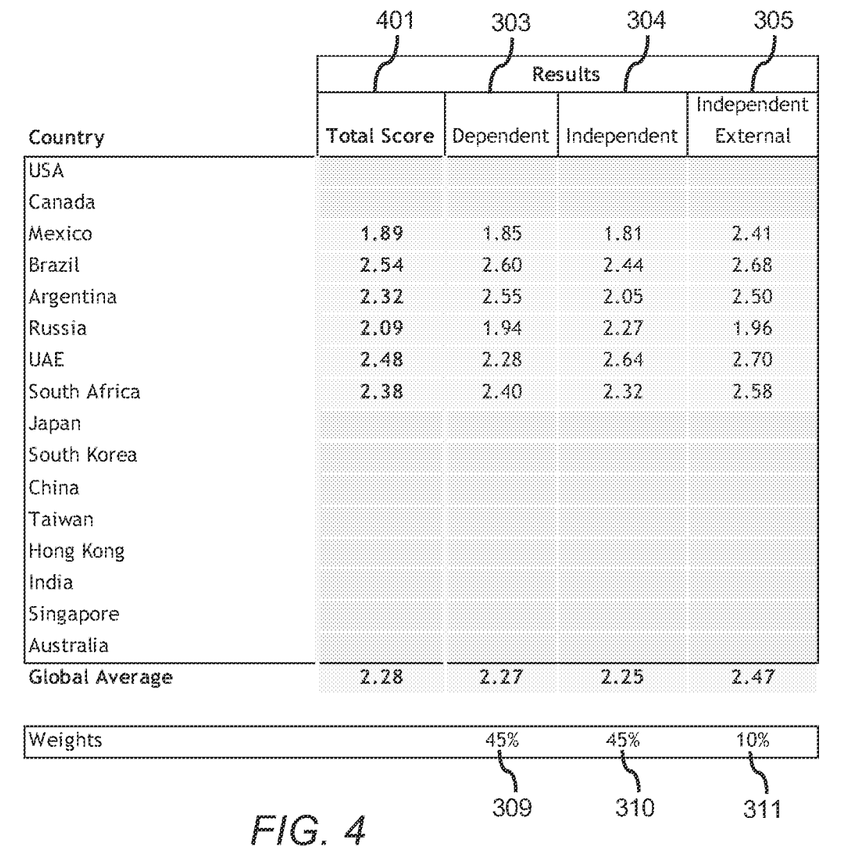
FIG. 4 illustrates examples of total scores by region, according to an embodiment.

The system 100 may be used to calculate total scores for different regions. FIG. 4 shows examples of total scores 401 for different countries. Also, shown are corresponding scores for each category and 303-305 and their weights 309-311. Global averages are also shown. A user viewing these results may identify Mexico as having bad input variables, and the simulator 120 and optimizer 140 may be used to identify input variables to modify in order to improve the total score for Mexico and build a better quality model for Mexico.

3. Methods

Figure 5:
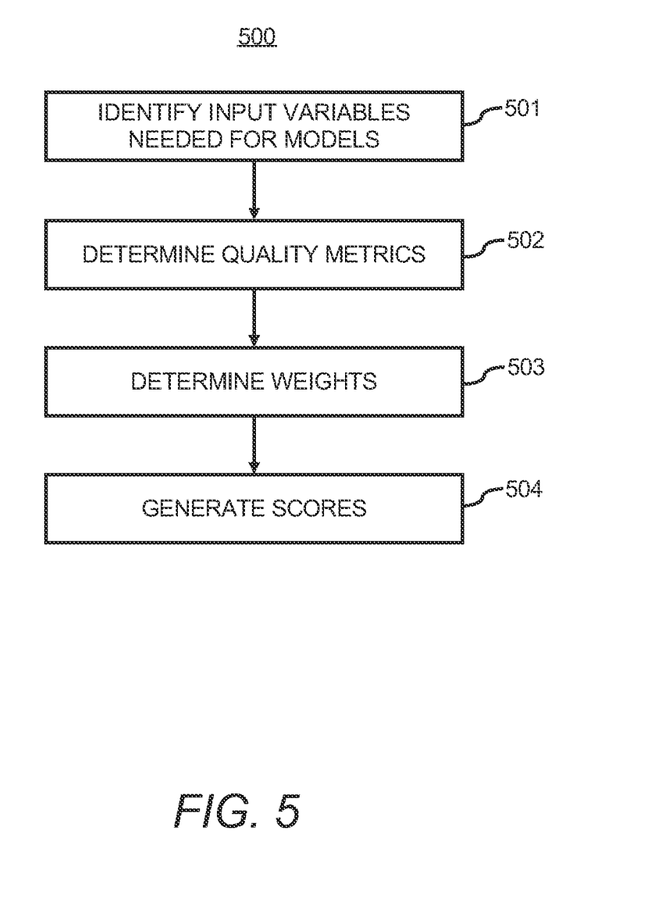
FIG. 5 illustrates a method for determining scores, according to an embodiment.

FIG. 5 illustrates a method 500 for determining scores, according to an embodiment. The scores are representative of the quality of the input variables for building an accurate model, which may be used to predicted values for sales variables or other dependent variables. The method 500 and other methods described below may be described with respect to one or more of FIGS. 1-4 by way of example and not limitation.

At step 501, the input variables are identified that are needed to build one or more models for estimating a sales variable, which may be a dependent variable. For example, FIG. 3 shows independent marketing variables, which may include amount spent on different marketing channels, external independent variables, and dependent variables, such as purchase volume. One or more of these variables may be used to estimate a sales variable. The estimated variable may include a dependent variable, such as purchase volume. For example, the model may be used to estimate purchase volume, given a certain marketing investment in each marketing channel and given values for external independent variables. Profit and customer lifetime are other examples of sales variables that may be estimated for selected set of input variables. A user may select the variables to use for the model.

At step 502, quality metrics are determined for the input variables. The quality metrics describe the sufficiency of data for the input variables. The data may be provided for different regions. Examples of quality metrics are shown in FIG. 2. For example, data may be provided from various sources for the input variables. A quality metric of data periodicity describes how often data from a source was collected for an input variable. In one example, it is assumed that data collected more frequently is considered more sufficient for creating a model and is given a higher score.

The scoring module 110 may determine the quality metrics by scoring the quality metrics based on a scoring scale and ranges assigned to each value on the scale. For example, the system 100 uses scores 0-3 and each score is assigned to a particular range for each quality metric. Examples of scores are shown in FIGS. 3 and 4, and examples of ranges mapped to each score are shown in FIG. 2.

At step 503, weights are determined. The weights include weights for each quality metric, weights for each input variable and for each category of input variables. Weights may also be determined for each type of source, such as shown for the different marketing channels in FIG. 3. The weights, scoring system and ranges may be determined based on accumulated knowledge of experts and/or analysis of historic data.

At step 504, the system 100 generates scores. The scores are generated for each input variable, each category, and for all the input variables, i.e., the total score, based on the sales impact data, the weights, and the scoring system, which may include the scoring scale (e.g., 0-3). The total score may be provided per region, as shown in FIG. 4.

Figure 6:
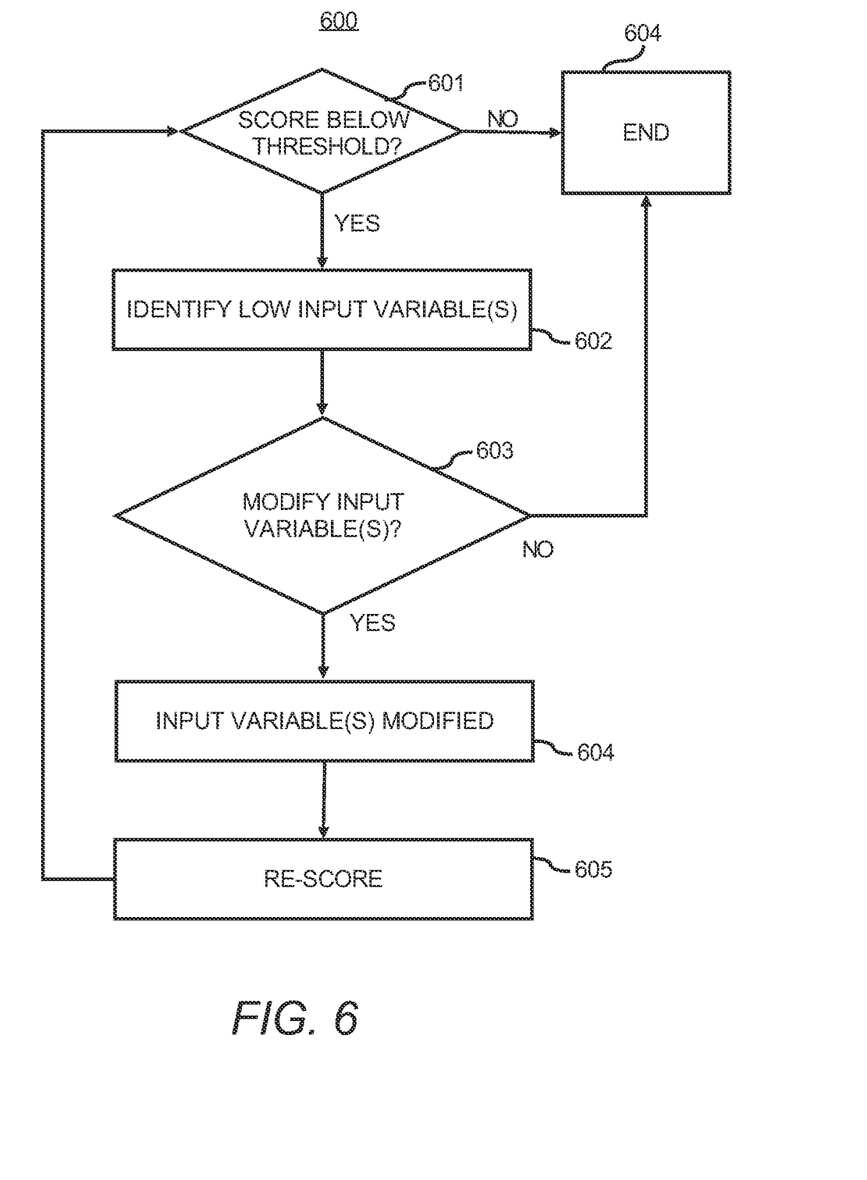
FIG. 6 illustrates a method for improving a total score, according to an embodiment, according to an embodiment.

FIG. 6 illustrates a method 600 for improving a total score, according to an embodiment. At step 601, a determination is made as to whether the total score is below a threshold. This may be a total score for a region. If the total score is below a threshold, then one or more individual input variables are identified that have low scores at step 602. The threshold may be predetermined by the user or another entity. For example, a threshold of 2 is determined and any total score below a 2 is considered insufficient for model building.

At step 603, a determination is made as to whether any of the input variables can be modified to potentially improve the total score. This may include obtaining data from a new source that has better quality metrics. Other sources may not be available and in these instances, the input variables and total score for region may not be improved, such as represented at step 604. If at least one input variable can be modified to potentially improve the total score for the region, the variable is modified at step 605, which may include obtaining data for the input variable that provides better quality metrics. At step 606, the region is re-scored. This includes calculating a new total score for the region using the modified input variables. Then, the method 600 may be repeated to determine if the new total score is above the threshold. For all regions having total scores above a threshold, a model may be built and used to forecast sales volumes or other dependent variables.

5. Computer Readable Medium

Figure 7:
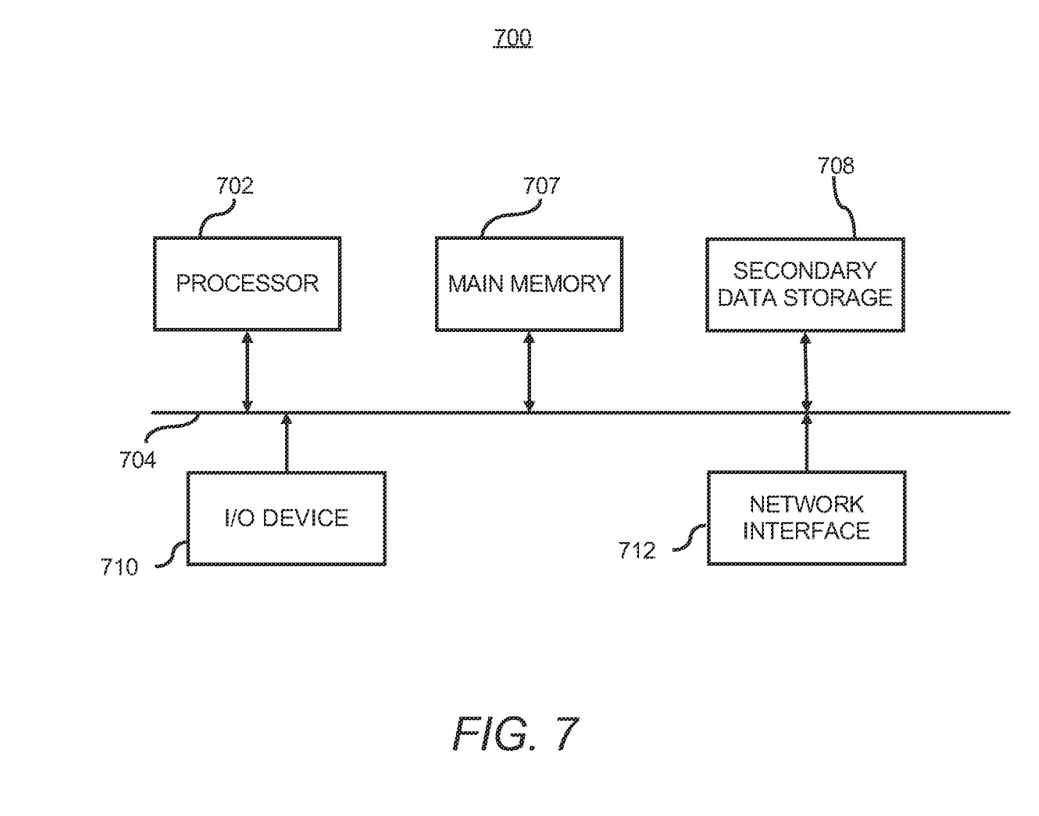
FIG. 7 illustrates a computer system that may be used for the methods and system, according to an embodiment.

FIG. 7 shows a computer system 700 that may be used with the embodiments described herein. The computer system 700 represents a generic platform that includes components that may be in a server or other computer system. The computer system 700 may be used as a platform for executing one or more of the methods, functions and other steps described herein. These steps may be embodied as software, including computer readable instructions, stored on one or more computer readable mediums, which may be non-transitory storage devices. Furthermore, the components of the system 100 shown in FIG. 1 may be software, hardware or a combination of hardware and software.

The computer system 700 includes a processor 702 that may implement or execute software instructions performing some or all of the methods, functions, and other steps described herein. Commands and data from the processor 702 are communicated over a communication bus 704. The computer system 700 also includes a main memory 707, such as a random access memory (RAM), where the software and data for processor 702 may reside during runtime, and a secondary data storage 708, which may be non-volatile and stores software and data. The memory and data storage are examples of computer readable mediums.

The computer system 700 may include one or more I/O devices 710, such as a keyboard, a mouse, a display, etc. The computer system 700 may include a network interface 712 for connecting to a network. It will be apparent to one of ordinary skill in the art that other known electronic components may be added or substituted in the computer system 700.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments. For example, the model optimization system 100 is generally described with respect to optimizing marketing models by way of example, The system 100 may be used to score variables and optimize other types of models, which may be for forecasting weather, stock markets, etc.

What is claimed is:

1. A model optimization system to determine quality of variables for model generation, the system comprising:
   data storage to store data including input variables, quality metrics for the input variables, and weights for the quality metrics, wherein the quality metrics quantify a sufficiency of the input variables in generating an accurate model, and wherein the data is provided for a plurality of regions;
   a processor to execute:
      a scoring module to:
         determine a quality metric score for each quality metric based on measurements for the quality metric; and
         determine an input variable score for each input variable based on the quality metric scores and the quality metric weights;
         determine a total score for each region of the plurality of regions based on the input variable scores, wherein to determine the total score for each region, the scoring module is to:
            determine categories for the input variables, wherein each category is associated with a type of input variable;
            determine category weights for each category;
            determine a category score for each category based on the input variable scores for the input variables associated with each category; and
            determine the total score for each region based on the category scores and the category weights; and
      an optimizer to
         determine whether at least one of the input variables for a region of the plurality of regions is to be modified based on the total score for the region, and
         in response to a determination that at least one of the input variables for a region of the plurality of regions is to be modified, determine whether the total score for the region is to be improved by applying a modified input variable having a different quality metric.

2. The model optimization system of claim 1, further comprising:
   a model builder to generate a model for each region having a total score above a predetermined threshold using the input variables.

3. The model optimization system of claim 1, wherein the categories comprise independent variables controlled by an entity, independent variables outside the entity's control, and dependent variables that are dependent on variables in another category.

4. The model optimization system of claim 1, wherein the optimizer is to
identify a total score that falls below a threshold due to at least one of insufficient data from collection sources and inconsistent calculations performed by different sources when determining the data.

5. A method for determining quality of data for modeling, the method comprising:
identifying, by a processor executing computer instructions, input variables to estimate a dependent variable, wherein the input variables are stored in a data storage;
determining quality metrics that quantify a sufficiency of the input variables in generating an accurate model, wherein the data is provided for a plurality of regions;
determining a quality metric score for each quality metric based on measurements for the quality metric;
determining an input variable score for each input variable based on the quality metric scores and quality metric weights for the quality metrics;
determining a total score for each region of the plurality of regions based on the input variable scores, wherein determining the total score for each region comprises:
determining categories for the input variables, wherein each category is associated with a type of input variable;
determining category weights for each category;
determining a category score for each category based on the input variable scores for the input variables associated with each category; and
determining the total score for each region based on the category scores and the category weights;
determining whether at least one of the input variables for a region of the plurality of regions is to be modified based on the total score for the region; and
upon determining that at least one of the input variables for a region of the plurality of regions is to be modified, determining whether the total score for the region is to be improved by applying a modified input variable having a different quality metric.

6. The method of claim 5, wherein determining a quality metric score comprises:
determining a scale of values for each quality metric;
comparing the measurement for each quality metric to a range of values mapped to values within the scale; and
determining the quality metric score for each quality metric based on the comparison.

7. The method of claim 5, wherein the categories comprise independent variables controlled by an entity, independent variables outside the entity's control, and dependent variables that are dependent on variables in another category.

8. The method of claim 5, wherein determining the total score for each region comprises:
determining sources for the data for the input variables;
determining source weights for each category; and
determining the total score for each region based on the source weights.

9. The method of claim 5,
wherein the determining of whether at least one of the input variables for a region of the plurality of regions is to be modified comprises determining the at least one of the input variables for the region is to be modified upon a determination that the total score for the region falls below a threshold; and
wherein the applying a modified input variable having a different quality metric comprises:
identifying an input variable from the input variables operable to be improved based on the quality metrics;
modifying the identified input variable;
re-scoring the region using the modified input variable to determine a new total score for the region; and
determining whether the new total score falls below the threshold.

10. The method of claim 5, further comprising:
generating a model for each region having a total score above a threshold using the input variables.

11. The method of claim 5, further comprising
identifying a total score that falls below a threshold due to at least one of insufficient data from collection sources and inconsistent calculations performed by different sources when determining the data.

12. A non-transitory computer readable medium storing computer readable instructions that when executed by a processor perform a method for determining quality of data for modeling, the method comprising:
identifying input variables to estimate a dependent variable;
determining quality metrics that quantify a sufficiency of the input variables in generating an accurate model, wherein the data is provided for a plurality of regions;
determining a quality metric score for each quality metric based on measurements for the quality metric;
determining an input variable score for each input variable based on the quality metric scores and quality metric weights for the quality metrics;
determining a total score for each region of the plurality of regions based on the input variable scores, wherein determining the total score for each region comprises:
determining categories for the input variables, wherein each category is associated with a type of input variable;
determining category weights for each category;
determining a category score for each category based on the input variable scores for the input variables associated with each category; and
determining the total score for each region based on the category scores and the category weights;
determining whether at least one of the input variables for a region of the plurality of regions is to be modified based on the total score for the region; and
upon determining that at least one of the input variables for a region of the plurality of regions is to be modified, determining whether the total score for the region is to be improved by applying a modified input variable having a different quality metric.

13. The computer readable medium of claim 12, wherein determining a quality metric score comprises:
determining a scale of values for each quality metric;
comparing the measurement for each quality metric to a range of values mapped to values within the scale; and
determining the quality metric score for each quality metric based on the comparison.

14. The computer readable medium of claim 12, wherein the categories comprise independent variables controlled by an entity, independent variables outside the entity's control, and dependent variables that are dependent on variables in another category.

15. The computer readable medium of claim 12, wherein determining a total score for each region comprises:
   determining sources for the data for the input variables;
   determining source weights for each category; and
   determining the total score for each region based on the source weights.

16. The computer readable medium of claim 12,
   wherein the determining of whether at least one of the input variables for a region is to be modified comprises determining the at least one of the input variables for a region is to be modified upon a determination that the total score for the region falls below a threshold; and
   wherein the applying a modified input variable having a different quality metric comprises:
      identifying an input variable from the input variables operable to be improved based on the quality metrics;
      modifying the identified input variable;
      re-scoring the region using the modified input variable to determine a new total score for the region; and
      determining whether the new total score falls below the threshold.

17. The computer readable medium of claim 12, wherein the method performed by the processor includes:
   identifying a total score that falls below a threshold due to at least one of insufficient data from collection sources and inconsistent calculations performed by different sources when determining the data.

\* \* \* \* \*